United States Patent [19]

Inoue et al.

[11] Patent Number: 5,102,043
[45] Date of Patent: Apr. 7, 1992

[54] METHOD AND APPARATUS FOR PRODUCING SNOW USING ULTRASONIC WAVES

[75] Inventors: Masanori Inoue; Susumu Kishi; Koji Ishihara; Akira Hagiwara, all of Kawasaki, Japan

[73] Assignee: NKK Corporation, Tokyo, Japan

[21] Appl. No.: 661,709

[22] Filed: Feb. 26, 1991

[30] Foreign Application Priority Data

Feb. 28, 1990 [JP] Japan .................. 2-48741

[51] Int. Cl.5 .......................... F25C 3/04; B05B 17/06
[52] U.S. Cl. ........................................ 239/2.2; 239/4; 239/14.2; 239/102.2
[58] Field of Search ............ 239/2.1, 2.2, 4, 14.1, 239/14.2, 102.2

[56] References Cited

U.S. PATENT DOCUMENTS

| | | | |
|---|---|---|---|
| 2,480,275 | 8/1949 | van Straten et al. | 239/2.1 |
| 4,085,893 | 4/1978 | Durley, III | 239/102.2 |
| 4,475,688 | 10/1984 | Hodges | 239/102.2 |
| 4,836,446 | 6/1989 | Chanel | 239/14.2 |

FOREIGN PATENT DOCUMENTS

| | | | |
|---|---|---|---|
| 2802083 | 7/1979 | Fed. Rep. of Germany | 239/102.2 |
| 1380797 | 3/1988 | U.S.S.R. | 239/102.2 |

Primary Examiner—Andres Kashnikow
Assistant Examiner—William Grant
Attorney, Agent, or Firm—Frishauf, Holtz, Goodman & Woodward

[57] ABSTRACT

A method for producing snow comprises producing a group of waterdrops by jetting water or water together with compressed air from a nozzle into the atmosphere of 0° C. or less, and freezing the group of waterdrops jetted by applying ultrasonic waves to the group of waterdrops. An apparatus for producing snow comprises a jetting apparatus for producing a group of waterdrops by jetting water or water together with compressed air into the atmosphere of 0° C. or less, and an ultrasonic wave generator for applying ultrasonic waves to the group of waterdrops jetted by the jetting apparatus.

11 Claims, 4 Drawing Sheets

METHOD AND APPARATUS FOR PRODUCING SNOW USING ULTRASONIC WAVES

BACKGROUND OF THE INVENTION

The present invention relates to a method and apparatus for producing snow, and more particularly for producing snow having properties appropriate for skiing on a slope of a skiing facility.

DESCRIPTION OF THE RELATED ART

An apparatus for producing snow is used for making snow used for skiing on a slope of a skiing ground. In the known apparatus for producing snow, snow is produced by jetting minute waterdrops into the atmosphere of 0° C. or less and causing the water drops to exchange their heat with that of cold open air to freeze the waterdrops. The prior art apparatuses for producing snow are roughly classified into three types of apparatuses which are referred to as (a) an air apparatus, (b) an airless apparatus, and (c) an air and airless apparatus. In this case, "air" means compressed air.

In the type (a) air apparatus 9 (shown in FIG. 5) for producing snow, there is used the principle that the temperature of air is lowered by adiabatic expansion of the air when compressed air is jetted from a nozzle 10 as shown in FIG. 5. In this apparatus, snow 11 is produced by simultaneously jetting air and water from one nozzle 10.

In the type (b) airless apparatus 12 (shown in FIG. 6) for producing snow, snow 11 is produced by jetting water into the atmosphere without using compressed air, producing waterdrops 13 in the state of a water mist, causing the waterdrops 13 to strike a rotating fan to make the waterdrops smaller and causing the waterdrops to be scattered high in the air. This apparatus is used, however, only when the temperature of the open air is at a predetermined temperature or less.

The type (c) air and airless apparatus for producing snow is a combination of the air apparatus, as shown in FIG. 7. This apparatus has two types of nozzles. In this apparatus, a great amount of snow is produced by cooling waterdrops 17 jetted from one nozzle 16 to produce supercooled water (water in a liquefied state without being frozen at 0° C. or less) and causing snow (ice nucleus) 20 jetted from the other air nozzle 19 to strike the waterdrops 17.

In the above-mentioned prior art air apparatus 9 for producing snow, snow can be produced even at a comparatively high temperature of air since lowering of the temperature due to adiabatic expansion of the air is utilized. However, the temperature of the atmosphere needs to be lower than a temperature of from −5° to −3° C. Moreover, only a considerably wet snow can be produced in the above-mentioned range of air temperature.

In the airless apparatus 12 for producing snow, since additional cold air is not supplied to waterdrops and ice nuclei are added to the waterdrops, snow cannot be produced if the atmospheric temperature is not lowered considerably (to the utmost temperature of −5° C. or less).

In the air and the airless apparatus 15, ice nuclei are made by an air nozzle. However, since this apparatus has, as a principle, a structure wherein the ice nucleus can be easily made by means of lowering of the temperature of the atmosphere due to the adiabatic expansion of the atmosphere, the ice nucleus cannot be made if the temperature of the atmosphere does not lower to the temperature of from approximately −3° to −5° C. as in the case of the air apparatus 9 for producing snow.

As described above, it is difficult to produce snow by the use of the prior art apparatus if the temperature of the atmosphere is not as low as about −5° C. If snow were produced, not dry snow, but snow containing a considerable amount of water would have been produced. When snow containing a considerable amount of water settles on the ground, it is liable to convert to snow in the state of sherbet (i.e., wet snow or icy snow), which is not appropriate for skiing.

The present inventors have made great efforts to solve the above-mentioned problems. As a result, they found that since a group of waterdrops jetted from nozzles were not easily frozen in the air due to their supercooling, snow having good properties for skiing could be obtained by causing the waterdrops to be released from the supercooled state even when the temperature of the air is below the freezing point close to 0° C.

SUMMARY OF THE INVENTION

The object of the present invention is to solve the above-described problems by providing a method and apparatus for producing snow, wherein a great amount of dry snow can be produced at a temperature of from −5° to 0° C.

The method of the present invention comprises producing a group of waterdrops by jetting water or water together with compressed air from a nozzle into the atmosphere, wherein the atmospheric temperature is 0° C. or less; and freezing the group of waterdrops.

The apparatus of the present invention for producing snow comprises a jetting apparatus for producing a group of waterdrops by jetting water or water together with compressed air from a nozzle; and a generator for applying ultrasonic waves to the group of waterdrops jetted from said jetting apparatus.

The above objects and other objects and advantages of the present invention will become apparent from the following detailed description, taken in conjunction with the appended drawings.

DESCRIPTION OF THE PREFERRED EMBODIMENT

Figure 1:
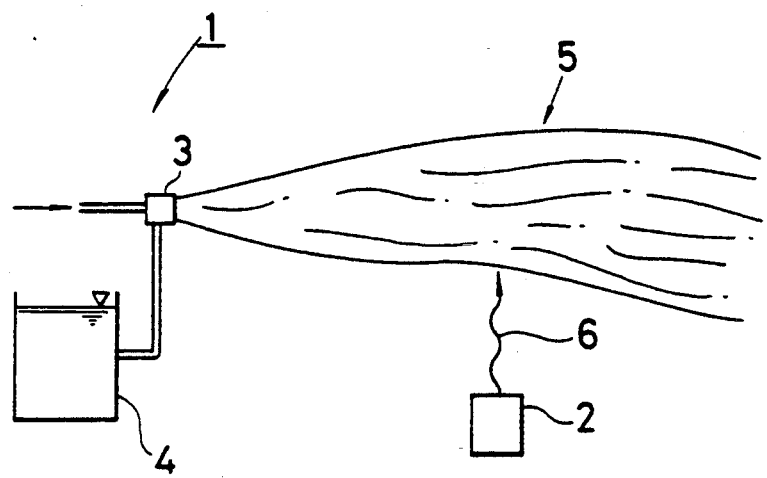
FIG. 1 is an explanatory view showing an apparatus of the present invention.

FIG. 1 is an explanatory view showing an apparatus of the present invention. As shown in FIG. 1, the apparatus for producing snow of the present invention comprises a jetting apparatus 1 for jetting waterdrops and a generator 2 for generating ultrasonic waves. The jetting apparatus 1 jets waterdrops from a nozzle 3 into the atmosphere by the use of compressed air. The particle size of the waterdrops is determined at from 5 to 500 μm. Reference numeral 4 denotes a water tank. Ultrasonic waves 6 (airborne ultrasonic waves) are emitted from the ultrasonic wave generator 2 toward a group of the waterdrops jetted from the nozzle 3. The frequency of the ultrasonic waves are from 15 to 50 kHz. The sound power is 100 dB or more at 1 m from the ultrasonic wave generator 2.

Waterdrops jetted from the nozzle 3 have their temperature lowered by exchanging their heat with the surrounding air during their movement through the air. Since the waterdrops are easily supercooled during heat exchange of the waterdrops with surrounding air, the waterdrops are not easily frozen at a temperature close to 0° C. even when the temperature of the atmosphere (surrounding air) is 0° C. or less. Therefore, since those waterdrops begin to freeze when they have fallen on the ground (for example, on a slope where snow settles), no snow is produced or wet snow containing a considerable amount of water is produced. In the present invention, the waterdrops are released from the supercooled state (and are thereby frozen) by applying ultrasonic waves emitted from the ultrasonic wave generator 2 to the group 5 of waterdrops jetted from the nozzle 3 into the atmosphere and being in the supercooled state and by vibrating the waterdrops. When the temperature of the atmosphere is about 0° C. or less, the waterdrops, when subjected to the ultrasonic wave 6, are released from their supercooled state and begin the freeze in the atmosphere, convert to snow containing a small amount of water, and fall on the ground are relatively dry snow.

In the apparatus for producing snow, a high frequency sound source having a large intensity and a high efficiency is advantageous for emitting the ultrasonic waves from the wave generator 2. As the generator for generating ultrasonic waves which has such a sound source, ultrasonic wave generators with a vibration plate and a ultrasonic wave generators for generating focused ultrasonic waves have been already developed and they are disclosed in "The Generation of Aerial Intense Ultrasonic Wave and Its Application" (Masatada Kawamura, Journal of the Institute of Electronics, Information and communication Engineers, 1984/4, VOL. 72, No. 4), the entire contents of which are incorporated herein by reference.

EXAMPLE

The present invention will now be described in greater detail with specific reference to the following Example.

Figure 2:
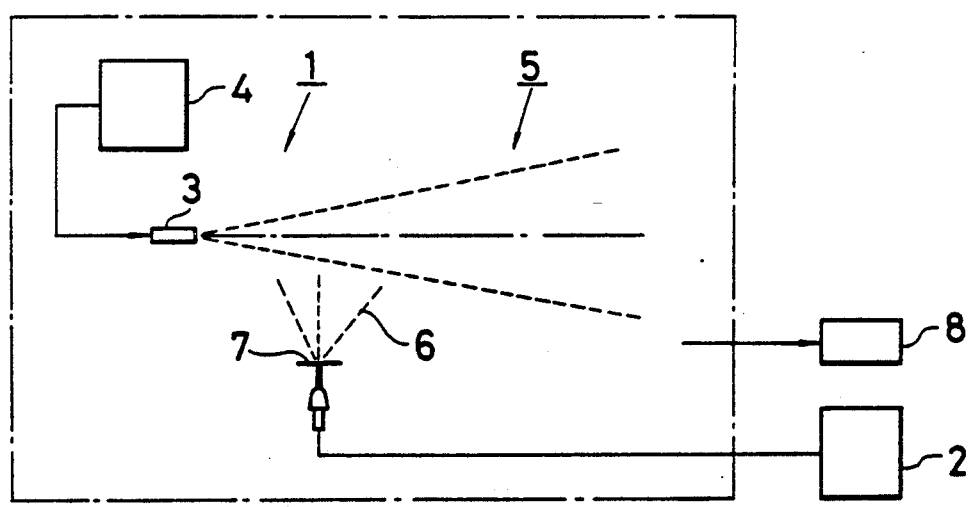
FIG. 2 is an explanatory schematic view showing an example of the present invention.
Figure 3:
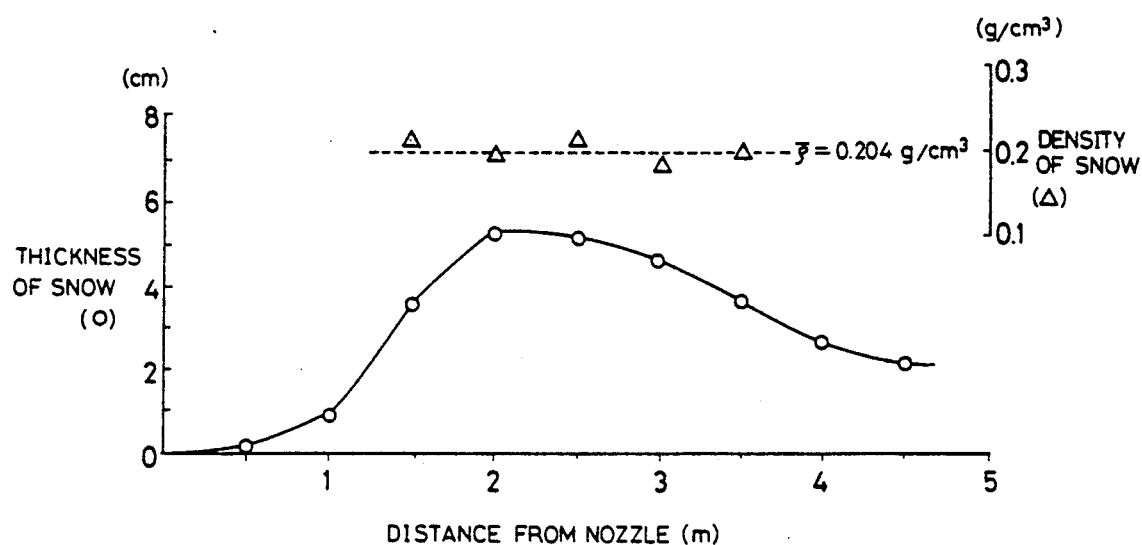
FIG. 3 is a graphical representation showing the relationship among the distance from a nozzle to each position of snow, the thickness of the snow and the densities of the snow, according to the method of the present invention.
Figure 4:
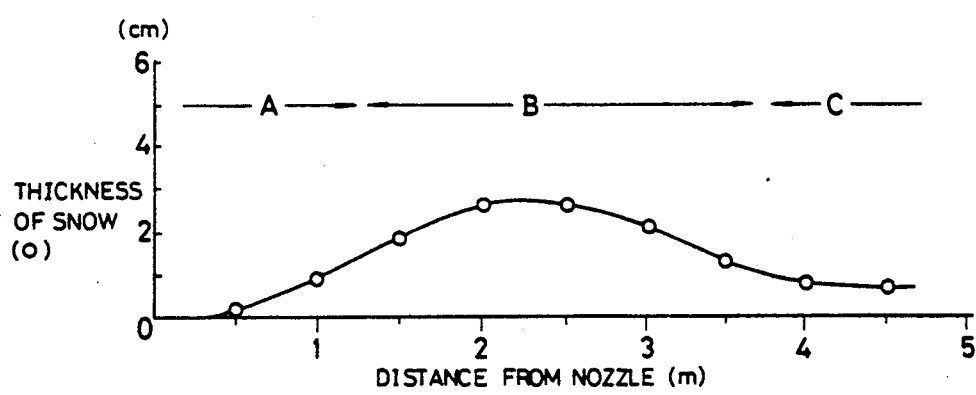
FIG. 4 is a graphical representation showing the relationship among the distance from a nozzle to each position of snow, the thickness of the snow and properties of the snow.
Figure 5:
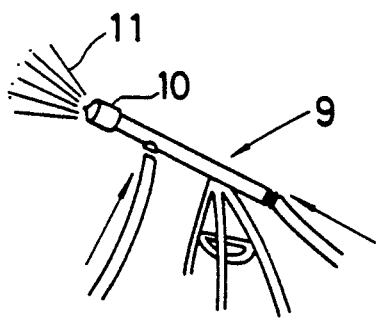
FIG. 5 is a perspective view showing an example of the prior art air apparatus for producing snow.
Figure 6:
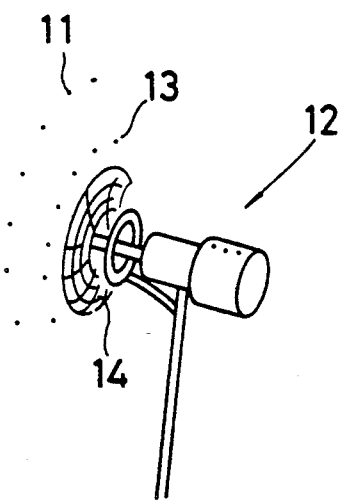
FIG. 6 is a perspective view showing an example of the prior art airless apparatus for producing snow.
Figure 7:
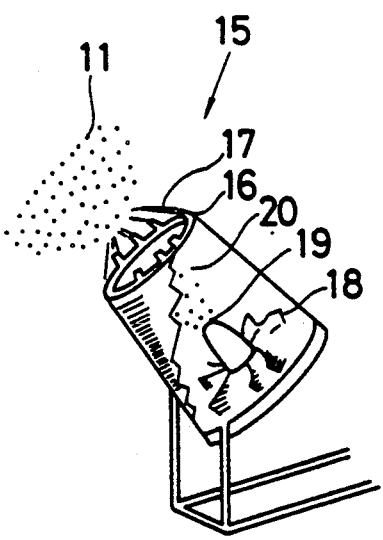
FIG. 7 is a perspective view showing an example of the prior art air and airless apparatus for producing snow.

Snow was produced by means of the method of the present invention by the use of the apparatus for producing snow of the present invention as shown in FIG. 2. The ultrasonic wave generator for generating ultrasonic waves comprises an ultrasonic wave vibration plate 7 as a sound source of the ultrasonic waves. A thermometer 8 is provided for measuring the temperature of the atmosphere. Water of 2° C. was jetted from the nozzle 3 in the atmosphere of −4° C. Ultrasonic waves 6 emitted from the ultrasonic wave generator 2 were applied to a group of waterdrops, whereby snow was produced. Then, the thickness, densities and properties of the snow were measured. The result obtained by studying the relationship among the distance from the nozzle to each position of the snow, the thickness of produced snow, the densities and properties of the snow is shown in FIG. 3. For comparison, a comparative example was carried out wherein the thickness and properties of snow produced without applying ultrasonic waves to the group 5 of waterdrops jetted from the nozzle 3 were measured, and the distance from the nozzle 3 to each position of the snow, the thickness and properties of the snow were studied. The result obtained from the comparative example are shown in FIG. 4. In FIG. 3, symbol ○ denotes the thickness of the snow and symbol △ the densities of the snow. In FIG. 4, symbol ○ denotes the thickness of the snow.

As shown in FIG. 3, in the example of the present invention, as the result of measuring the thickness of the snow at intervals of 50 cm from the nozzle 3, the maximum thickness of the snow was 5.2 cm (at a distance of about 2 m from nozzle 3) and the densities of the snow about 0.2 g/cm$^3$. As a result, it became clear that snow much drier than snow produced by means of the prior art method could be produced using the technique of the present invention. The dry snow in appropriate for skiing, and it is understood that snow fit for a slope of a skiing ground can be produced by means of the method and apparatus of the present invention. In comparison, as shown by B in FIG. 4, in a system where the ultrasonic waves were not emitted and were not applied to the group of waterdrops (i.e., the comparative example), the thickness of snow shows the maximum value of about 2.6 cm at a position of about 2 to 2.5 m from the nozzle. This thickness was about half of the thickness of snow produced in the Example using the technique of the present invention. Moreover, in the comparative example the snow produced had a large particle size and was like granulated sugar. The lower portion of the snow was wet. As shown with A in FIG. 4, the snow had a small particle size and was like granulated sugar in the range of from the nozzle to a position of 1.3 m from the nozzle. As shown by C in FIG. 4, the snow in the comparative example had a small particle size and was like granulated sugar also at positions of more than 4 m from the nozzle.

Further, when snow was produced by changing the temperature of the atmosphere in the range of from −5° to 0° C., the maximum thickness of the snow in the Example of the present invention (see FIG. 3) was larger than that of the snow in the comparative example (see FIG. 4), and the densities of the snow in the Example of the present invention were smaller than those of the snow in the comparative example. In the Example of the present invention wherein snow was produced in the atmosphere having a temperature of −1° C., snow was also produced reliably. It was understood that snow could be produced in an atmosphere having a temperature of about 0° C. (0° C. or less) according to the present invention.

When snow is produced by the use of an ultrasonic wave generator to which the vibration plate is not mounted, snow slightly inferior to the snow produced in the above-described Example is obtained. That is, the densities of the snow are slightly larger than those of the snow in the above-described Example and the thickness of the snow is slightly smaller than that of the snow in the above-described Example. However, when an ultrasonic wave generator is used, a higher effect can be obtained.

Further, when snow was produced by the use of a focused generator for generating ultrasonic waves as a sound source of ultrasonic waves under the same condition as in the above-described Example, a higer effect could be obtained.

Figure 8:
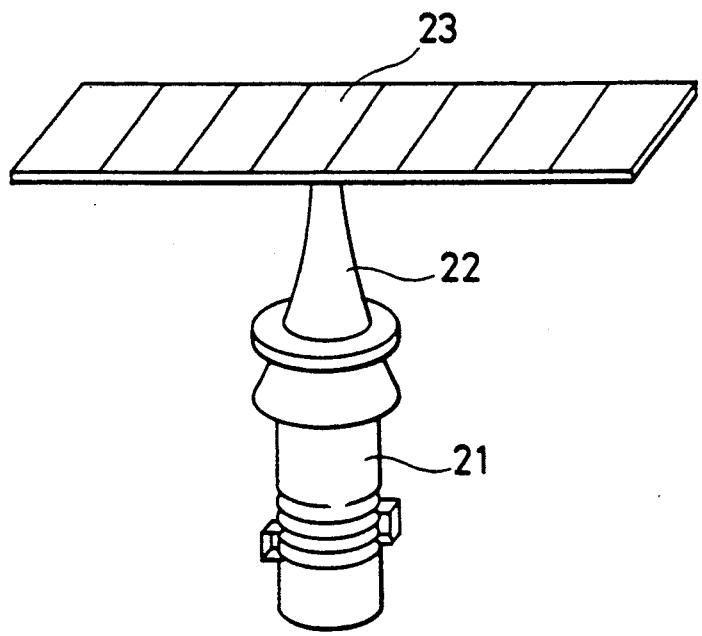
FIG. 8 is a perspective view showing an example of the vibration plate generator for generating ultrasonic waves in the example of the present invention.

The ultrasonic wave generator for generating ultrasonic waves used in the Example of the present invention is a vibration plate generator for generating ultrasonic waves shown in FIG. 8. The vibration plate generator for generating ultrasonic waves has a structure wherein a rectangular striped vibration plate 23 is mounted at the tip of a metallic horn 22 fixed to a piezoelectric transducer 21. When the piezoelectric transducer 21 is vibrated by a generator (not shown), the rectangular striped vibration plate 23 is vibrated whereby sound waves are emitted into the atmosphere.

Figure 9:
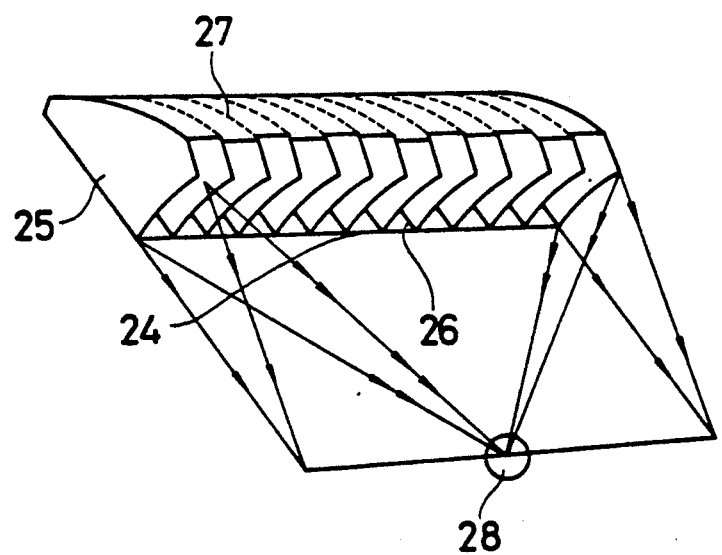
FIG. 9 is a perspective view showing an example of the focused generator for generating ultrasonic waves.

As shown in FIG. 9, the focused generator for generating ultrasonic waves has a structure wherein plane separators 25 are arranged perpendicular to a rectangular striped vibration plate 24 along nodal lines 26 of the rectangular striped vibration plate 23 and sound waves between the plane separators which have phases opposite to each other are adjusted so that those waves can have the same phases. Radiation sound pressures from the surfaces of the rectangular striped vibration plate 24 can be focused linearly by means of the above-mentioned structure. The radiation sound waves can be focused on a focal point 28, (which can be optionally selected, by adjusting the focal distance and the positions of a reflecting plate 27 and the rectangular striped vibration plate 24. A strong sound field can be formed in small range by focusing the radiation sound waves.

In this way, the ultrasonic waves having a stronger sound field (sound pressure amplitude) are desirable in terms of the effect of vibration of the waterdrops.

As described above, according to the present invention, since the waterdrops in the atmosphere can be released from the supercooled state by utilizing the aerial ultrasonic waves, production of snow can be increased to a greater extent than in the prior art, as shown by the above-described comparative example. At the same time, dry and powdery snow having good properties for skiing can be produced. Moreover, snow can be produced in an atmosphere having a temperature of about 0° C. (0° C. or less). Accordingly, snow fit for a skiing slope can be obtained with high efficiency by the use of the method of the present invention, which thus produces an industrially advantageous effect.

When the present invention is applied to cloud, waterdrops of the cloud are easily frozen whereby it becomes possible to control meteorology by means of artificial rainfall and artificial snowfall. The artificial rainfall and artificial snowfall mean that the rainfall and snowfall are accelerated by freezing supercooled minute waterdrops forming a cloud. Attempts have previously been made to cause it to rain or to snow by scattering silver iodide or dry ice on cloud and freezing minute waterdrops forming the cloud. However, when the method of the present invention is applied to the artificial rainfall or snowfall, the artifical rainfall or snowfall can be easily realized.

What is claimed is:

1. A method for producing snow, comprising the steps of:
    producing a group of waterdrops by jetting at least water from a nozzle into the atmosphere, wherein the atmosphere has a temperature of about 0° C. or less; and
    freezing the group of waterdrops jetted from the nozzle by applying ultrasonic waves to the group of waterdrops at a predetermined distance from the nozzle.

2. The method of claim 1, wherein said waterdrops have a particle size of from 5 to 500 μm.

3. The method of claim 1, wherein said ultrasonic waves are high frequency ultrasonic waves having a frequency of from 15 to 50 kHz.

4. The method of claim 1, wherein said ultrasonic waves have a sound power of 100 dB or more at a distance of 1 m from a sound source.

5. The method of claim 1, wherein said atmosphere has a temperature of from about −5° to about 0° C.

6. The method of claim 1, wherein said waterdrops jetted from the nozzle are supercooled, and wherein the waterdrops are released from their state by said ultrasonic waves applied thereto.

7. The method of claim 1, wherein said step of producing said group of waterdrops comprises producing said group of waterdrops by jetting water together with compressed air from the nozzle into the atmosphere.

8. An apparatus for producing snow, comprising:
    a jetting apparatus means for producing a group of waterdrops by jetting at least water from a nozzle into the atmosphere, wherein the atmosphere has a temperature of about 0° C. or less to produce supercooled waterdrops; and
    generating means for emitting ultrasonic waves and for applying the ultrasonic waves to the group of waterdrops jetted from said jetting apparatus at a predetermined distance from the nozzle, for releasing the waterdrops from their supercooled state, thereby permitting freezing of the waterdrops in the atmosphere.

9. The appararatus of claim 8, wherein said generating means for emitting ultrasonic waves comprises a vibration plate generator for generating ultrasonic waves.

10. The apparatus of claim 8, wherein said generating means for generating ultrasonic waves comprises a focused generator for generating ultrasonic waves.

11. The apparatus of claim 8, wherein said jetting apparatus means comprises means for producing the group of waterdrops by jetting water together with compressed air from the nozzle.

* * * * *